(12) United States Patent
Borger et al.

(10) Patent No.: US 9,571,443 B2
(45) Date of Patent: Feb. 14, 2017

(54) MOBILE DEVICE MESSAGE ENABLED ON-LINE COMMUNITY BULLETIN BOARD

(71) Applicant: International Business Machines Corporation, Armonk, NY (US)

(72) Inventors: Sergio Borger, Demarest, NJ (US); Carlos H. Cardonha, Sao Paulo (BR); Fernando Luiz Koch, Sao Paulo (BR)

(73) Assignee: International Business Machines Corporation, Armonk, NY (US)

(*) Notice: Subject to any disclaimer, the term of this patent is extended or adjusted under 35 U.S.C. 154(b) by 346 days.

(21) Appl. No.: 13/958,607

(22) Filed: Aug. 5, 2013

(65) Prior Publication Data
US 2014/0108567 A1    Apr. 17, 2014

Related U.S. Application Data

(60) Provisional application No. 61/712,881, filed on Oct. 12, 2012.

(51) Int. Cl.
*G06F 15/16* (2006.01)
*H04L 12/58* (2006.01)

(52) U.S. Cl.
CPC ............ *H04L 51/32* (2013.01); *H04L 51/36* (2013.01)

(58) Field of Classification Search
CPC ..................................... H04L 51/32
USPC .......................................... 709/206
See application file for complete search history.

(56) References Cited

U.S. PATENT DOCUMENTS

| | | | |
|---|---|---|---|
| 5,923,846 A * | 7/1999 | Gage et al. ................. | 709/213 |
| 6,493,703 B1 * | 12/2002 | Knight et al. | |
| 7,159,011 B1 * | 1/2007 | Knight et al. .............. | 709/207 |
| 7,508,354 B1 | 3/2009 | Sanders et al. | |
| 7,519,381 B2 | 4/2009 | Klassen et al. | |
| RE41,754 E * | 9/2010 | Knight ....................... | 715/751 |
| 7,991,728 B2 | 8/2011 | Kaplan | |
| 8,826,139 B1 * | 9/2014 | Wendkos et al. .......... | 715/736 |
| 2002/0133369 A1 * | 9/2002 | Johnson ........................ | 705/1 |
| 2006/0291483 A1 | 12/2006 | Sela | |
| 2008/0167015 A1 | 7/2008 | Vishwanathan et al. | |
| 2010/0250652 A1 * | 9/2010 | Suzuki ........................ | 709/203 |
| 2011/0078588 A1 * | 3/2011 | Klemm ....................... | 715/753 |
| 2012/0072855 A1 * | 3/2012 | Baldwin et al. ............ | 715/752 |
| 2012/0197927 A1 * | 8/2012 | Qian ................. | G06F 17/30702 |
| | | | 707/769 |

OTHER PUBLICATIONS

Christopher A. Le Dantec, "Community resource messenger: A mobile system and design exploration", Aug. 2011.

* cited by examiner

*Primary Examiner* — Phuoc Nguyen
(74) *Attorney, Agent, or Firm* — Law Office of Charles W. Peterson, Jr.; Louis J. Percello, Esq.

(57) ABSTRACT

A community information sharing system, method and program product therefore. A communications network with connected communications devices serves community communications device users. A communications network gateway is associated with a community communications server, e.g., on a cloud computer, and couples the communications network to a data network. The gateway interfaces communications devices connected to communications network with the communications server, providing communications devices access to an online message board, message board information and services.

20 Claims, 6 Drawing Sheets

MOBILE DEVICE MESSAGE ENABLED ON-LINE COMMUNITY BULLETIN BOARD

CROSS REFERENCE TO RELATED APPLICATION

The present application is a continuation of provisional U.S. Application Ser. No. 61/712,881 "System and Method for Interpersonal and Community Communications Involving Interactive Online Message Boards on Shared IT Infrastructure using Mobile Devices for Communications Interface and Voice and Text Message Gateway including techniques for Match Making, Filtering, Clustering, and Reputation Analysis" to Sergio Borger et al., filed Oct. 12, 2012, assigned to the assignee of the present invention and incorporated herein by reference.

BACKGROUND OF THE INVENTION

Field of the Invention

The present invention is related to online community bulletin boards and more particularly to connecting to and receiving information from cloud-based online community bulletin boards from other than data network devices.

Background Description

Recently, cloud computing has offered great opportunities for a broad range of applications. Cloud service providers (e.g., with mainframe computers) share Information Technology (IT) infrastructure with users/clients, connected together over networks in what constitutes a client-cloud system. The shared IT infrastructure (the cloud computers) provides end-user content and support, to i.e., supply services and resources and handle data-intensive computing tasks for the clients. Client devices have become much more lightweight and mobile, small enough to be hand held. Provided a high speed or broadband connection is available, these lightweight, mobile devices provide users with a robust experience, even allowing access to resources managed by the larger shared resource providers, including access to cloud services.

Typical state of the art bulletin boards can be characterized in one of two types, web based and/or mobile message based. Web based boards may be cloud based and are designed and optimized for online display and use through a typical state of the art web browser, e.g., on a computer display or on a publicly located monitor. Typical mobile message boards are designed to interface with mobile devices using standard messaging technologies, e.g., short message service (SMS). However, web based postings have not been disseminated using SMS and vice versa. Consequently, messages on either type service may not be not accessible by anyone using the other service. Mobile device users, for example, may have limited access to web based board posts, if any; while mobile message board posts are unavailable through, and not formatted for viewing from, the Internet.

For example, people in rural areas with limited or no broadband access, specific communities of people with disabilities, groups of people performing work for enterprises, may all require sharing/shared community information. However, sharing online board information may be impractical without broadband. Similarly, someone living in a cellular dead zone may only have access through a broadband connection and, therefore, not have access to mobile message boards. In each of these instances access community content is limited to local populace.

Thus, there is a need for sharing of community communications cross platform with different types of media users; and in particular, there is a need for all-encompassing community communications exchanges providing combined access to information on disparate message boards, such as web-based boards and mobile message notifications, and with mobile users connecting through mobile messaging while web users connect over the Internet.

SUMMARY OF THE INVENTION

A feature of the invention is cross platform message sharing of messages among users of multiple connected platforms;

Another feature of the invention is cross platform sharing of content for online message boards with devices associated with end-users of the platforms;

Yet another feature of the invention is cross platform sharing of online message board content in shared IT infrastructure with devices associated with end-users of platforms including telecommunications devices and web connected devices.

The present invention relates to a community information sharing system, method and program product therefore. A communications network with connected communications devices serves community communications device users. A communications network gateway is associated with a community communications server, e.g., on a cloud computer, and couples the communications network to a data network. The gateway interfaces communications devices connected to communications network with the communications server, providing communications devices access to an online message board, message board information and services.

BRIEF DESCRIPTION OF THE DRAWINGS

The foregoing and other objects, aspects and advantages will be better understood from the following detailed description of a preferred embodiment of the invention with reference to the drawings, in which.

DESCRIPTION OF PREFERRED EMBODIMENTS

Figure 1:
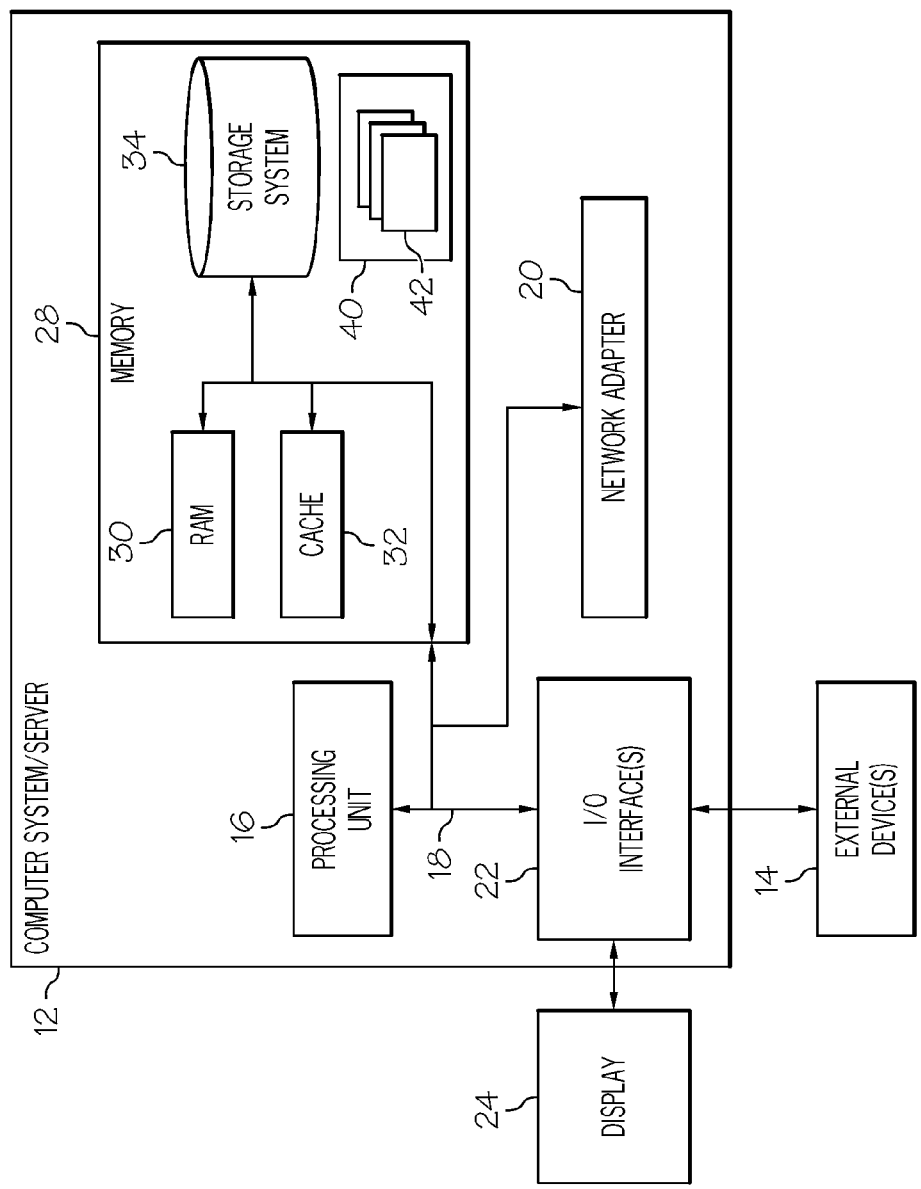
FIG. 1 depicts a cloud computing node according to an embodiment of the present invention.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed and as further indicated hereinbelow.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communications can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
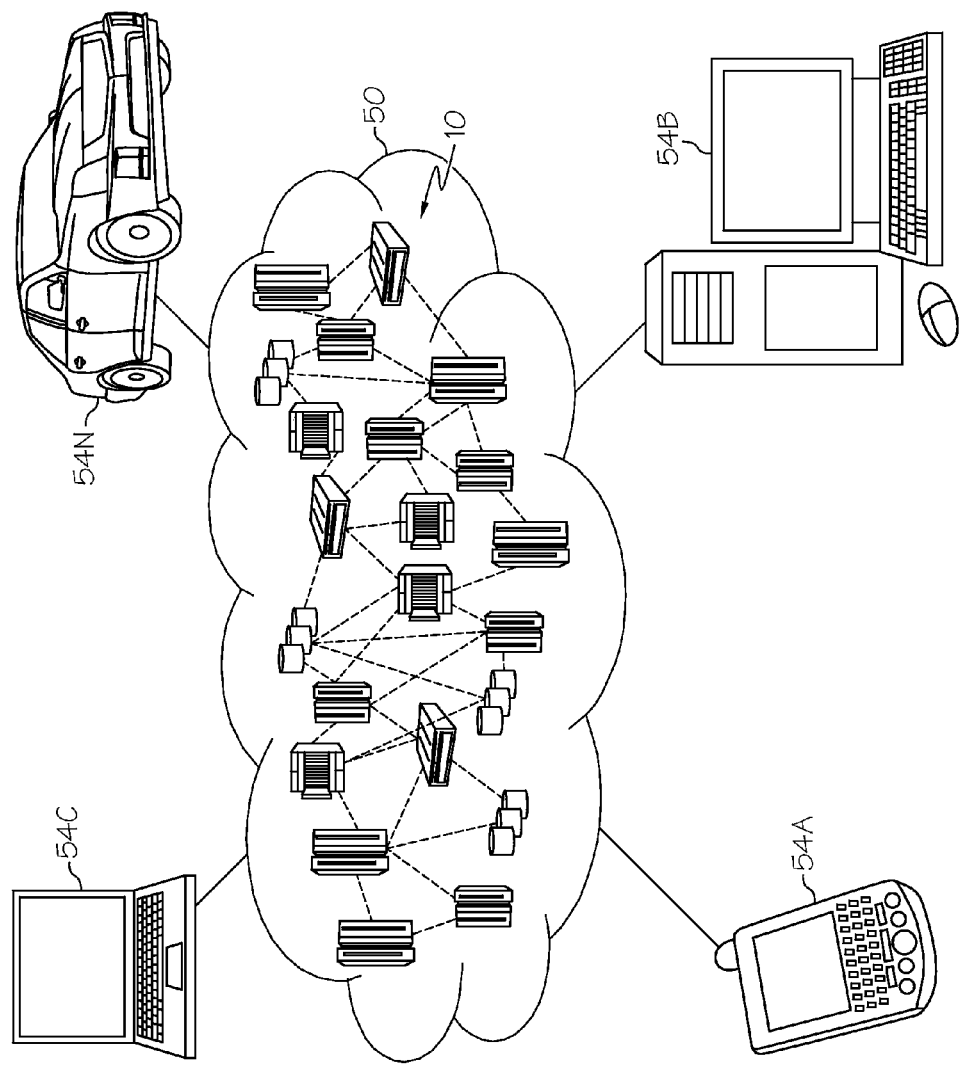
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
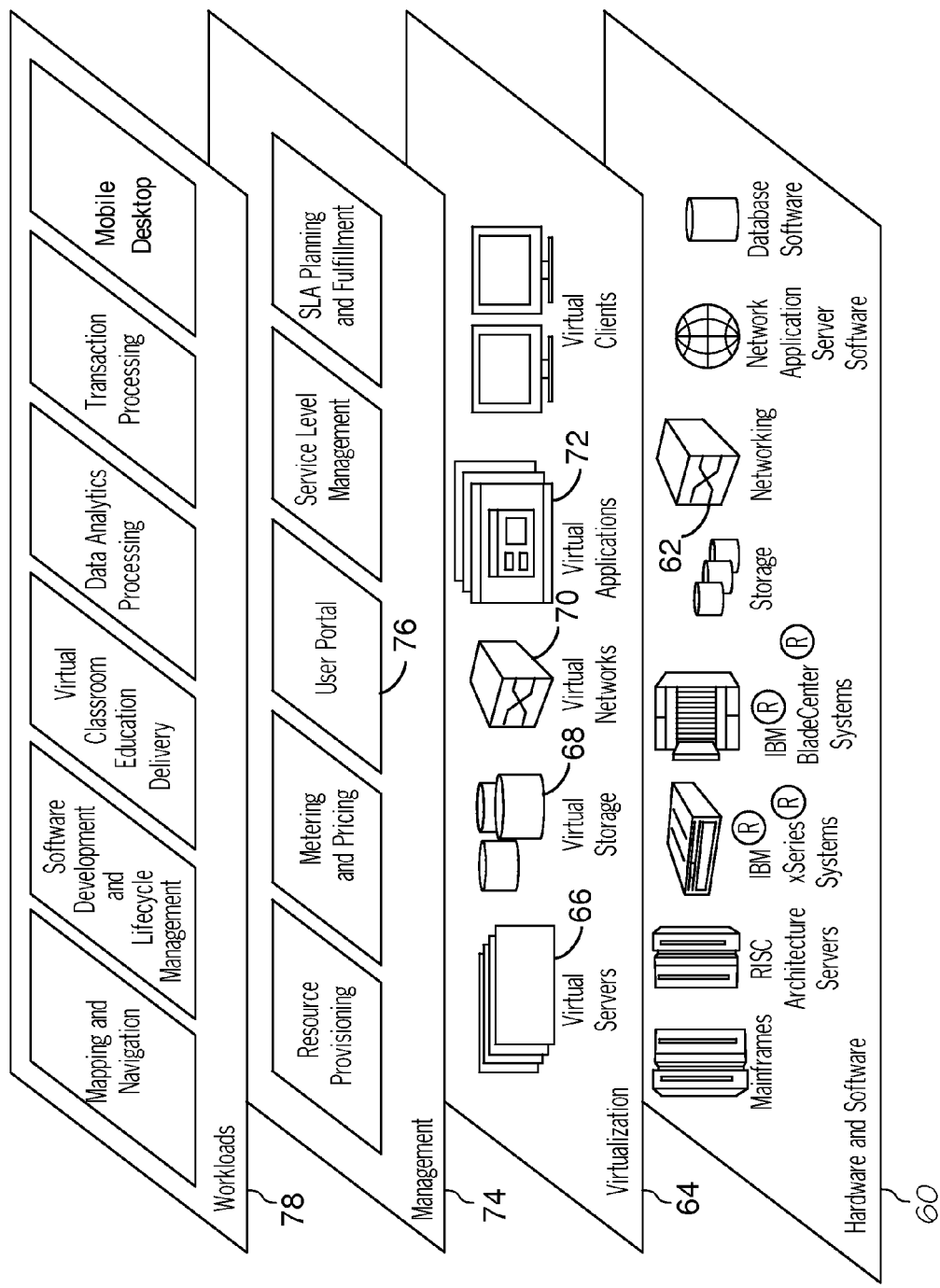
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components 62. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 64 provides an abstraction layer from which the following examples of virtual entities may be provided: virtual servers 66; virtual storage 68; virtual networks 70, including virtual private networks; virtual applications 72 and operating systems; and virtual clients.

In one example, management layer 74 may provide the functions described below. Preferred, context aware resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 76 provides access to the cloud computing environment for consumers and system administrators. Preferred, context aware service level management provides cloud computing resource allocation and management such that required service levels are met. Preferred, context-aware Service Level Agreement (SLA) planning and fulfillment provide pre-arrangement for, and procurement of, cloud computing resources for which a future requirement is anticipated in accordance with an SLA.

Workloads layer 78 provides examples of functionality for which the cloud computing environment may be utilized. Examples of workloads and functions which may be provided from this layer include: mapping and navigation; software development and lifecycle management; virtual classroom education delivery; data analytics processing; transaction processing; and Mobile Desktops.

Figure 4:
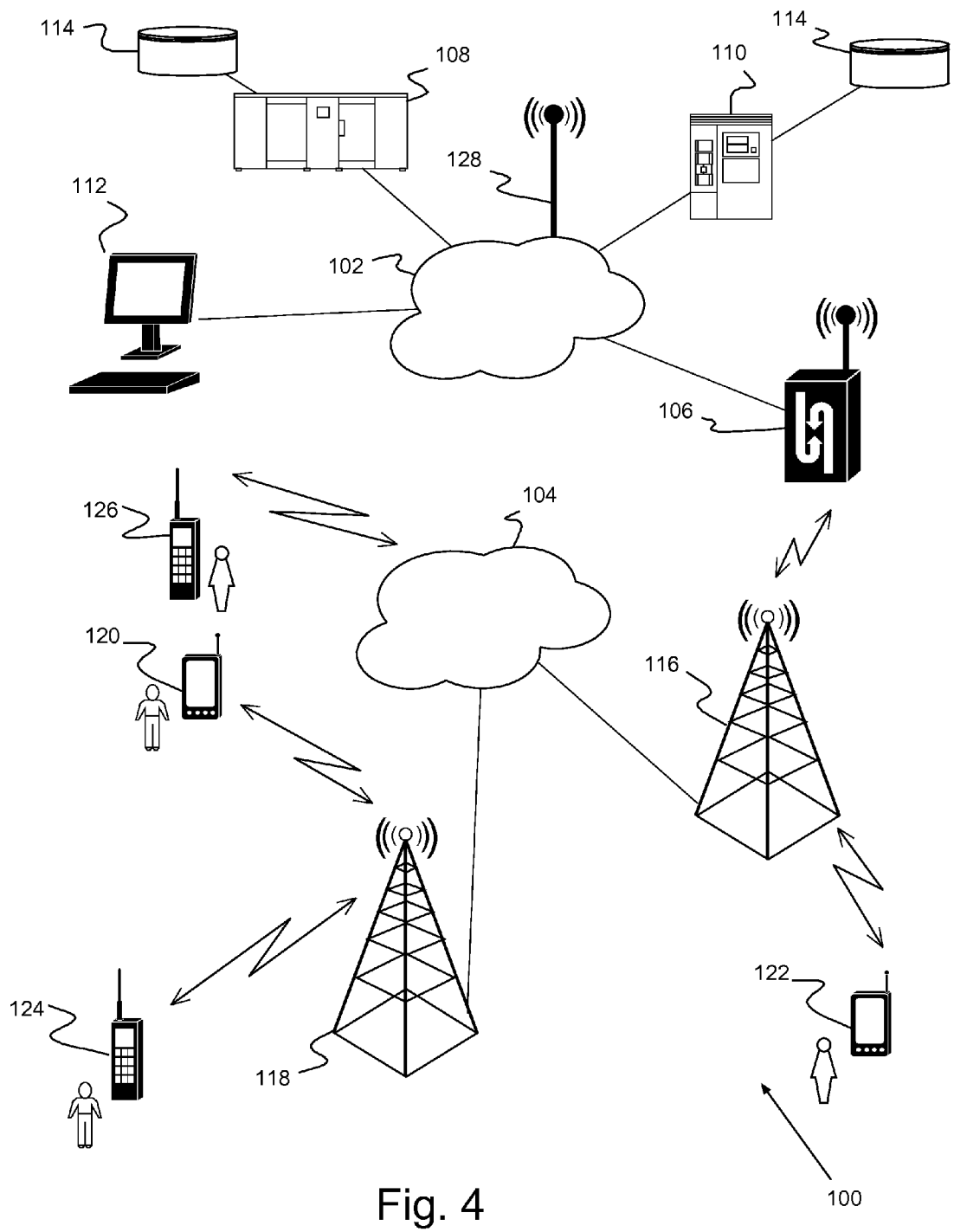
FIG. 4 shows an example of a preferred community message board system, wherein telecommunications users on public telecommunications network are networked with online message boards on shared Information Technology (IT)

FIG. 4 shows an example of a preferred online message board system 100 on data network 102, wherein communications users on communications network 104 connect to community message boards on shared Information Technology (IT) infrastructure. A device 106 associated with an online message board or community bulletin board acts as a mobile telephone bridge or gateway that couples the communications network 104 to the data network 102, e.g., through user portal 76 in FIG. 3. IT infrastructure on data network 102 may include any suitable combination of computers and/or workstations 108, 110, 112 and local storage 114 with reference to FIGS. 1-3. The preferred communications network 104 is a telecommunications network with land based wireless connection points 116, 118 supporting wireless mobile telecommunications devices 120, 122, 124, 126, e.g., cell phones. The data network may also include a facility for connecting wirelessly 128 and/or for wire connected devices. Some portion or all of the communications network 104 serves a community, where community members including telecommunications device 120, 122, 124, 126 users share information on an online message board, or community bulletin board, associated with gateway 106.

The data network 102 may be the Internet, an intranet, a local area network (LAN) including a wireless LAN or WiFi network 128, or any combination thereof. Preferably, however, data network 102 includes a virtual network 70 with virtual storage 66 and online message boards on virtual servers 68, including, for example, communications servers, database servers, bulletin board servers and other web page servers. Data network users interface with the servers normally, e.g., using a standard web browser. At least one computer (e.g., cloud computer 108) or virtual server 68 acts as a communications server associated with, and communicating with, gateway 106.

Preferably, the communications network 104 is a typical mobile telecommunications network, such as a third generation (3G) or a fourth generation (4G) cellular or cell network, for example. Thus, the preferred communications network 104 includes, for example, suitable telecommunications infrastructure and telecommunications systems, each running automatically or operator assisted. Typical such telecommunications infrastructure includes multiple land based wireless connection points, e.g., towers 116, 118 at cellular network base stations. The communications devices 120, 122, 124, 126 interface with online bulletin board(s), e.g., updating content with messages to and through respective gateway(s) 106 and associated communications server(s).

Wireless mobile devices 120, 122, 124, 126 may include, for example, simple cell phone and/or smart phones, some of which are capable of text communication, e.g., short message service (SMS) capable. The text capable devices 120, 122, 124, 126 connect to the mobile communications network 104 through the wireless connection points 116, 118, including with text (and optionally multimedia content) messages to and from the gateway 106.

Optionally, the gateway 106 and wireless mobile devices 120, 122, 124, 126 may be dual mode devices, e.g., a mobile telephone with cellular and WiFi capability, connected wirelessly to both networks 102, 104 transferring bulletin board messages to/from mobile device 120, 122, 124, 126. Dual mode gateway device(s) 106 may be, for example, a mobile phone with a dual wireless capability for connecting wirelessly to both the communications network 104 through cell towers 116, 118 and the data network 102, e.g., through WiFi connection 128.

Each gateway 106 receives messages, such as text messages, from communications devices 120, 122, 124, 126. The gateway 106 extracts underlying information from these messages and transmits extracted information to the associated communications server, which forwards message contents to a bulletin board. The mobile devices 120, 122, 124 communicate with the preferred communications server through the telecommunications network 104, gateway(s) 106, the data network 102 and back as described hereinbelow.

An online message board and communications server is associated with each gateway 106. Each respective communications server organizes message data for the message board, e.g., in columns identified by labels. The preferred communications server also maintains a data repository, e.g., in storage 114. The data repository holds the bulletin board database with online board content classified, e.g., by associated board column. Mobile devices 120, 122, 124, 126 provide database updates to the communications server, which processes received data, e.g., with match making, filtering, clustering, and reputation analysis applications, for the data repository. The communications server or a separate web server generates web pages from data repository data.

Optionally, the communications server may maintain profiles of registered users to facilitate identifying compatible messages, e.g., input and updated over the Internet or through text messages. Further, users may subscribe to the whole board, one or more board subsections, or board sub-contents with specific matches based on text analytics rules. This allows information-matching of user messages and/or of the user profile to existing board information and messages, or to indicated subsections.

Figure 5:
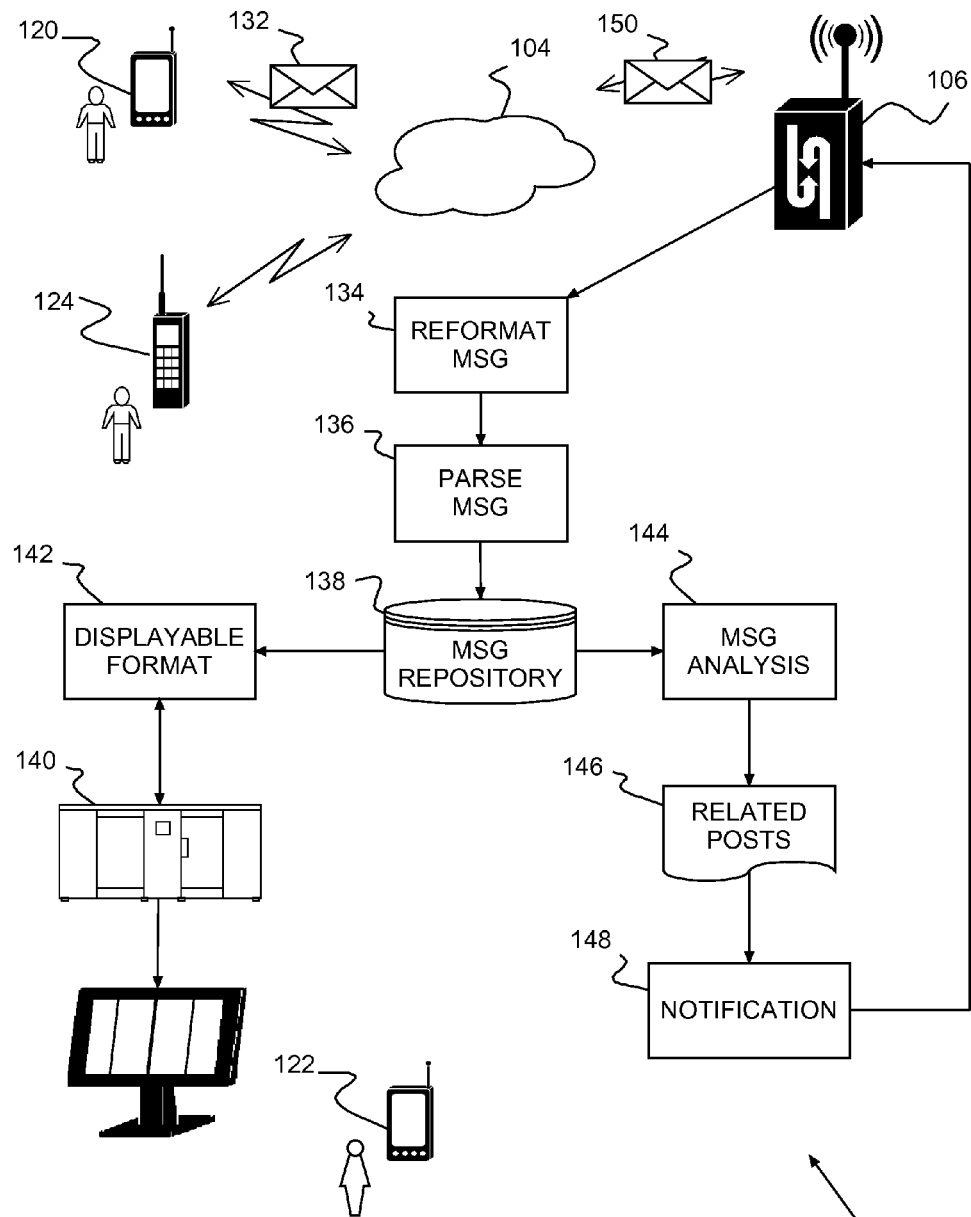
FIG. 5 shows an example of users messaging with message boards on a preferred community message board system, according to a preferred embodiment of the present invention.

FIG. 5 shows an example of users messaging 130 with a message board on a preferred community message board system (100 in FIG. 4), according to a preferred embodiment of the present invention. Communications begins with a message 132 (e.g., text, audio, video or a combination thereof) to the gateway 106 from one of the mobile devices, 120 in this example. Upon receiving the message, the gateway 106 relays the content, converting the message to suitable data network format 134, e.g., an Internet protocol, and retransmits it over the data network 102 to the communications server. The communications server parses 136 the message to extract information and enters the relevant data in the bulletin board message repository 138. A bulletin board server 140 requests board updates in a displayable format 142. The communications server responds to the request with current data for display 144.

Coincidentally, the communications server identifies a compatible message set (M) of previously added board messages, and generates a corresponding set of posts 148 through match making, filtering, clustering, and reputation analysis. The communications server generates a response message 148 listing the message set and returns the response to the gateway 106. The gateway 106 returns the response 150 through the communications network 104 to inform the respective mobile device 120, 124 about the listed similar posts.

So in this example, a mobile device 120 sends a message 132 over communications network 104 to the gateway 106, e.g. a text to the gateway phone number. Typically, the message 132 indicates the message origin (device 120 in this example), a message type and includes a body. The messages 132 body may be text only or, optionally, include, multimedia content message, e.g., audio, images and/or video. Each message is formatted in a typical communications message format, e.g., for short message service (SMS). Upon receiving the message 132, the gateway 106 translates 134 it to a suitable data network format. For example, the gateway 106 may reformat 134 the message to a typical packet message format for retransmission to the communications server, e.g., Transmission Control Protocol/Internet Protocol (TCP/IP).

A preferred gateway 106 or the communications server may include a multimedia engine for handling these multimedia messages 130. The preferred multimedia engine is capable of translating and augmenting text and text metadata with multimedia content. Thus, upon receipt of a multimedia message 132, the gateway 106 or transcribes the message 132 content, e.g., origin, type, and text-body, to text prior to reformatting 134 for retransmission to the communications server. Alternately, the gateway 106 may reformat and forward the multimedia message 132 to the communications server for transcription.

As each reformatted message 132 arrives, the communications server parses 136 the message 132 to extract relevant information. Then, the communications server adds the relevant content to the associated bulletin board database 138. Subsequently, the bulletin board server requests 140 board updates. The communications server responds to the request by reformatting the database data in a displayable format 142 and formats the displayable content to the bulletin board server.

Then or substantially simultaneously, the communications server identifies 144 a compatible message set, e.g., using a suitable well known matching algorithm, and a corresponding set of similar posts 146. Corresponding posts 146 may be identified 144, for example, by matching new requests with messages in the set, analytics, filtering, clustering and reputation analysis. Text analytics algorithms may be applied to text messages. Audio messages transcribed by the gateway 106, e.g., using Automated Speech Recognition (ASR), with text analytics algorithms applied to the transcription results. Optionally, a camera may be installed close to public displays of each board, filming people watching board content for example. Captured video may be used for video analytics algorithms.

Applying message filtering and clustering and user reputation analysis techniques to the analytics results may further improve the results. A filtering example eliminates text with obscene or irrelevant content. Clustering may classify users based, for example, on geographical location, content of sent messages, user profile and similar context. Reputation analysis may be used to evaluate the level of importance (and, eventually, the intention) of messages sent by a certain user.

The communications server responds 148, e.g., with a return message 150, through the gateway 106 to inform the respective mobile device 120 about the similar posts. The communications server may use a user configuration from a user profile to select whether messages 150 are text only, multimedia or a combination thereof. Text and/or audio messages 150 may originate from previously posted web messages. Further, user profiles may indicate registered boards and a timeframe when each message displays on each respective board, e.g., on a public display 152 in the mezzanine of a public building or health care facility. User profiles may list target boards with contents that may be of interest, e.g., boards with posted messages for comparison against/matching new messages from the registered user. Each board server may identify a maximum matching set, such as a set of related message pairs with maximum cardinality. User profile may also be enriched by user reputation, used to evaluate the impact and relevance of the person's messages.

Preferably, a board administrator(s) administers each board and has the ability to edit and/or remove posted messages, e.g., using a web portal. Preferably also, board messages display a tag, such as a barcode. The tags may be readable by mobile devices, e.g. a smartphone or tablet. Such a mobile device may be equipped with an app such as are well known in the art, that retrieves the message content, e.g., text or audio, in response to visually capturing the tag displayed on the board. The mobile device app may perform recognition locally or, alternately, recognition may be done by a cloud service, with corresponding content retrieved, e.g., over the Internet or over a state of the art cellular network (3G or 4G).

So for example, a user may advertise regional availability as a caretaker for partially or fully incapacitated people. The user sends a message to the board offering services. The message may be a voice and/or text message from a mobile device to the phone number of the gateway associated with the online board. The gateway forwards the message to the communications server in shared IT infrastructure, which stores the message in the message repository. The online board continually refreshes and displays message updates, e.g., on a public board at a care facility, and posts the new message with the next update. Another user, looking for a caretaker, may view the message on the board display to select the posting user. Alternately, someone looking for a caretaker may message (call or text) the associated gateway and request posted messages from the board. The board server detects matches for the message from active board messages. The communications server answers through the gateway with a response message (text or voice) with the matching information.

Figure 6:
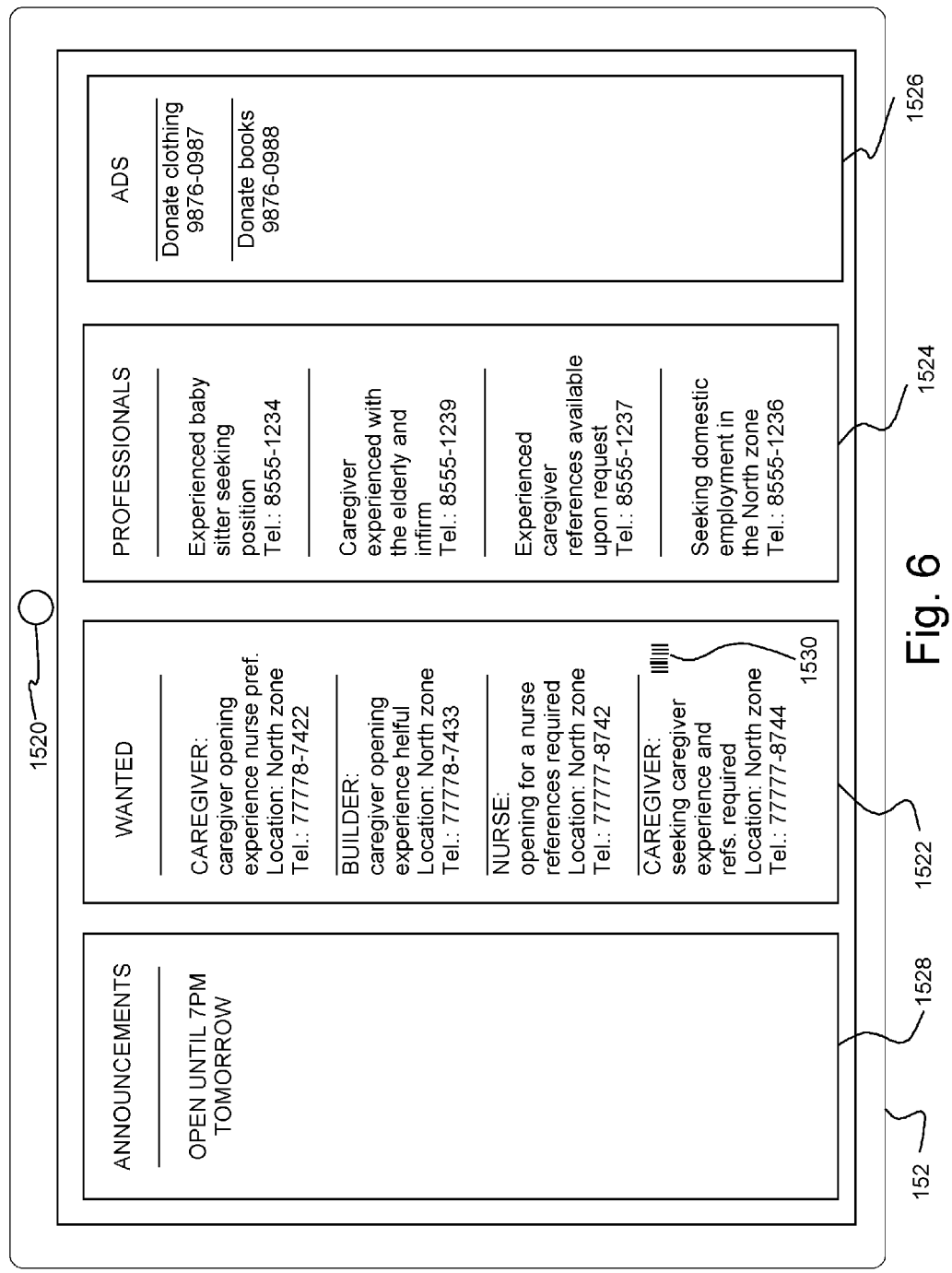
FIG. 6 shows an example of a public displayed board, that may be equipped with a sensor sensing, and software for, automatically recognizing nearby registered users and devices.

FIG. 6 shows an example of a publicly displayed board 152 that may be equipped with a sensor 1520 sensing and a facility for software for automatically recognizing nearby registered users and devices. Suitable sensors may be for biometric recognition and/or device recognition using, for example, infrared (IR), video recognition, Bluetooth, WiFi, or Near field communications (NFC). A local computer, e.g., built into the display, receives raw sensor data and identifies those nearby. Alternately, raw sensor data is forwarded to cloud computer for interpretation. After sensing a registered user or user device in the vicinity of the display, the respective board server identifies messages of potential interest to the registered user and returns (displays) the identified message(s), e.g., messaging (text or voice) the user device. Further the board sensor system may be equipped (locally or at the board server) with a human-to-machine interface capturing search commands, e.g., local gesture or voice commands. Optionally, the human-to-machine interface may vocalize related messages.

Each board displays content 1522, 1524 in locale sensitive order that varies according to the characteristics of the local region. For example, frequently matching messages, that may be more likely to match new messages, appear with higher frequency and/or are assigned a higher priority. Optionally, public boards may include context sensitive advertising 1526, e.g., ads selected by location, crowd present, and crowd profile. Each board displays content in a number of columns that may vary according to location. For example, a board display in one location may contain 4 columns 1522, 1524, 1526, 1528, while 3 columns may display in some other location, e.g., on a home computer. Displayed message content may be modified and/or adapted for accessibility. For example, simple words may be substituted for complicated word or the message may be translated from one language to another. Additionally, message content may include reference codes, partially or completely substituted for original content. Users can determine interest by reference code for retrieving complete information from the remote server.

Board messages may include location information, e.g., street address or latitude and longitude, mapped or mappable on the board display to indicate message origination positions. Further messages may include visual indicators 1530, e.g., bar codes, identifying certain message properties or reference codes. Messages may indicate popularity, for example, by red letters indicating messages with a large number of potential matches, and green letters for a small number of potential matches. Messages also may indicate age or submission time with icons, e.g., with square icons designating recently submitted messages, and round icons designating older messages.

Further, portable devices augmented with a reality app may provide users with a board visualization capability. Such equipped devices visualize and display only messages that are of interest to the particular user with the display being controllable, e.g., through multi-touch/touch screen input. The augmented device may be used to identify boards automatically, e.g., for a board on a fixed display by geographical position, or based on a tag that individually identifies the board. Previously registered users set a profile with each particular board that specifies areas of interest. When the augmented device identifies a particular board, the device requests that the respective server return a list of messages from that board that may be of interest to the registered user.

Advantageously, the present invention makes information more accessible to community members, especially members with otherwise limited or no broadband access. People and communities with such limited access interact with community bulletin boards, e.g., cloud based bulletin boards, using simple mobile devices that are capable of exchanging text, voice, and/or other multimedia messages.

While the invention has been described in terms of preferred embodiments, those skilled in the art will recognize that the invention can be practiced with modification within the spirit and scope of the appended claims. It is intended that all such variations and modifications fall within the scope of the appended claims. Examples and drawings are, accordingly, to be regarded as illustrative rather than restrictive.

What is claimed is:

1. A community information sharing system comprising:
   a cellular communications network serving at least a portion of a community;
   one or more computers connected to a data network;
   a message board server on said data network, said message board server making a community message board web browsable through said data network, said community message board including a display displaying community messages in a web browser and at least one sensor sensing any mobile telecommunications devices in the vicinity of said display, displayed said community messages being selected for users associated with said any mobile telecommunications devices in the vicinity of said display; and
   at least one cellular communications network gateway coupling said communications network to said data network, each cellular communications network gateway being associated with a communications server on said data network, said cellular communications network gateway interfacing cellular communications devices connected to said cellular communications network with said communications server, said cellular communications devices messaging posts to, and receiving messaging responses to said posts from, said community message board through said cellular communications network gateway.

2. A community information sharing system as in claim 1, wherein said one or more computers further comprise a database server and a web page server.

3. A community information sharing system as in claim 1, wherein said data network comprises the Internet.

4. A community information sharing system as in claim 3, wherein said display displays said community messages in an online bulletin board in a web browser displayable format, said cellular communications devices and said cellular communications network gateway include a messaging capability, and said cellular communications devices messaging online bulletin board messages including text messages to and from said cellular communications network gateway.

5. A community information sharing system as in claim 4, said cellular communications network gateway reformatting messages from said cellular communications devices from a messaging format to said web browser displayable format, and forwarding reformatted said messages to said communications server, said online bulletin board displaying said messages from said cellular communications devices.

6. A community information sharing system as in claim 5, said data network further comprising a bulletin board message repository, said communications server parsing each received message to extract information and entering extracted information in said bulletin board message repository.

7. A community information sharing system as in claim 6, said communications server identifying related posts from said bulletin board message repository and returning a notification listing identified said related posts.

8. A community information sharing system as in claim 6, wherein said one or more computers comprise a plurality of provider computers in a cloud environment.

9. A method of managing a community bulletin board, said method comprising:
   sending a message in a messaging format from a cellular communications device connected to a cellular communications network with a plurality of connected cellular communications devices;
   receiving said message at a cellular communications network gateway connected to said cellular communications network, said cellular communications network gateway reformatting said message in a web browser displayable format as a web based posting;
   forwarding said reformatted message over a data network including one or more computers, at least one computer including a communications server associated with said cellular communications network gateway, said cellular communications network gateway forwarding said reformatted message to said communications server;
posting said web based posting to an online community bulletin board responsive to said reformatted message;
sensing any mobile telecommunications devices in the vicinity of said display; and
displaying said online community bulletin board in a web browser, any web posts for users associated with any sensed said mobile telecommunications devices being displayed.

10. A method as in claim 9, further comprising:
parsing information from said message; and
entering parsed relevant data in a bulletin board message repository.

11. A method as in claim 10, further comprising:
analyzing said data stored for said reformatted message for related posts to said online community bulletin board;
listing identified said related posts; and
messaging a notification listing said related posts.

12. A method as in claim 11, messaging said notification comprising:
sending said notification over said data network to said cellular communications network gateway; and
sending a messaging notification from said cellular communications network gateway over said cellular communications network.

13. A method as in claim 9, wherein said one or more computers are cloud computers, and before sending said message said method further comprises provisioning said communications server on said cloud computers.

14. A computer program product for managing an online community bulletin board, said computer program product comprising a non-transitory computer usable medium having computer readable program code stored thereon, said computer readable program code comprising:
computer readable program code means for receiving messages in a messaging format from cellular communications devices connected to a cellular communications network serving a community;
computer readable program code means for forwarding received said messages over a data network;
computer readable program code means for reformatting said messages into a web browser displayable format;
computer readable program code means for displaying reformatted said messages in a community bulletin board;
computer readable program code means for returning notifications in said messaging format indicating related bulletin board posts;
computer readable program code means for receiving sensor signals from a display displaying said received messages;
computer readable program code means for identifying users of said community bulletin board responsive to received said sensor signals; and
computer readable program code means for selecting posts for display responsive to identified said users.

15. A computer program product for managing an online community bulletin board as in claim 14, wherein said data network comprises the Internet and a display displaying community messages in a web browser.

16. A computer program product for managing an online community bulletin board as in claim 15, wherein said computer readable program code means for receiving messages comprises computer readable program code means for reformatting messages in said messaging format from said cellular communications devices into said web browser displayable format, said reformatted messages being forwarding to a communications server provisioned on a cloud computer.

17. A computer program product for managing an online community bulletin board as in claim 16, further comprising computer readable program code means for parsing each message to extract information, enter extracted information in a bulletin board message repository, analyze said extracted information to identify related posts having overlapping subject matter, and return notifications listing identified said related posts.

18. A computer program product for managing a community bulletin, said computer program product comprising a non-transitory computer usable medium having computer readable program code stored thereon, said computer readable program code causing one or more computers executing said code to:
receive a message in a messaging format from a cellular communications device connected to a cellular communications network with a plurality of connected cellular communications devices;
forward said message to a cellular communications network gateway connected to said cellular communications network, said cellular communications network gateway reformatting said message in a web browser displayable format as a web based posting;
forward said reformatted message over a data network including one or more computers, at least one computer being a communications server associated with said cellular communications network gateway, said cellular communications network gateway forwarding said reformatted message to said communications server; and
post said web based posting to an online community bulletin board responsive to said reformatted message;
sensing any mobile telecommunications devices in the vicinity of said display; and
displaying said online community bulletin board in a web browser, any web posts for users associated with any sensed said mobile telecommunications devices being displayed.

19. A computer program product for managing a community bulletin as in claim 18, wherein at least one of said one or more computers is a cloud computer in a cloud environment, said computer readable program code further causing one or more computers executing said code to:
parse information from said message; and
enter parsed relevant data in a bulletin board message repository.

20. A computer program product for managing a community bulletin as in claim 19, said computer readable program code further causing one or more computers executing said code to:
analyze said data stored for said reformatted message for related posts to said online community bulletin board;
list identified said related posts;
send a notification including said list over said data network to said cellular communications network gateway; and
send a messaging notification from said cellular communications network gateway over said cellular communications network.

* * * * *